United States Patent [19]

Goebel et al.

[11] Patent Number: 4,651,519
[45] Date of Patent: Mar. 24, 1987

[54] COMBINED GAS-TURBINE PLANT PRECEDED BY A COAL GASIFICATION PLANT

[75] Inventors: Konrad Goebel, Erlangen; Bernard Becker, Mülheim/Ruhr, both of Fed. Rep. of Germany

[73] Assignee: Kraftwerk Union Aktiengesellschaft, Mülheim/Ruhr, Fed. Rep. of Germany

[21] Appl. No.: 814,577

[22] Filed: Dec. 27, 1985

Related U.S. Application Data

[63] Continuation of Ser. No. 614,309, May 25, 1984, abandoned.

[30] Foreign Application Priority Data

May 31, 1983 [DE] Fed. Rep. of Germany ....... 3319711

[51] Int. Cl.⁴ ............................ F02C 3/28; F02C 6/18
[52] U.S. Cl. ................................ 60/39.12; 60/39.182
[58] Field of Search ............... 60/39.02, 39.12, 39.182; 137/568

[56] References Cited

U.S. PATENT DOCUMENTS

| | | |
|---|---|---|
| 2,501,751 | 3/1950 | Aldridge ............................ 137/568 |
| 3,183,666 | 5/1965 | Jackson . |
| 3,868,817 | 3/1975 | Marion et al. . |
| 4,019,314 | 4/1977 | Springmann ........................ 60/39.12 |
| 4,158,948 | 6/1979 | Schlinger ............................ 60/39.12 |
| 4,250,704 | 2/1981 | Bruckner et al. ................... 60/39.12 |
| 4,378,920 | 4/1983 | Ronnels et al. ..................... 137/568 |

FOREIGN PATENT DOCUMENTS

| | | |
|---|---|---|
| 0038138 | 10/1981 | European Pat. Off. . |
| 0047596 | 3/1982 | European Pat. Off. . |
| 2807326 | 8/1979 | Fed. Rep. of Germany . |
| 3100751 | 7/1982 | Fed. Rep. of Germany . |
| 1167493 | 10/1969 | United Kingdom . |
| 2067668 | 7/1981 | United Kingdom ............... 60/39.12 |
| 2075124 | 11/1981 | United Kingdom . |

OTHER PUBLICATIONS

ASME Paper, Title: Novel Gas Turbine Cycles with Coal Gasification, by S. Hamilton & S. J. Lehman.
Article from Dec. 1979 COMBUSTION—Title: The Integration of Gasification with Combined Cycle Power Plants, by R. W. Foster-Pegg, Westinghouse Electric Corp.

*Primary Examiner*—Louis J. Casaregola
*Attorney, Agent, or Firm*—Herbert L. Lerner; Laurence A. Greenberg

[57] ABSTRACT

Combined gas turbine/steam turbine plant, in which the exhaust gas line of the gas turbine block containing an air compressor, combustion chamber, gas turbine and generator is connected on the primary side to a steam generator which, in turn, comprises parts of the steam turbine block which also contains a high pressure and a low pressure turbine, a condenser, a feedwater tank and a feedwater pump. The combustion chamber of the gas turbine block is connected to the output of a coal gasification plant, the air separation unit which has an outlet for the separated nitrogen and the gasifier. The gasifier is followed by a steam generator for utilizing the raw gas heat and a heat exchanger for heating the purified gas by the raw gas. The steam generator arranged ahead of the raw gas/purified gas heat exchanger is designed as a high pressure steam generator, the secondary output of which is connected to the output of the steam generator of the steam turbine block. The raw-gas/purified-gas heat exchanger is followed by a low pressure steam generator, the secondary output of which is connected to the low pressure part of the steam turbine. The nitrogen outlet of the air separation unit located in the coal gasification plant is connected exclusively to the purified gas line leading to the combustion chamber or to the burners in the combustion chamber.

2 Claims, 1 Drawing Figure

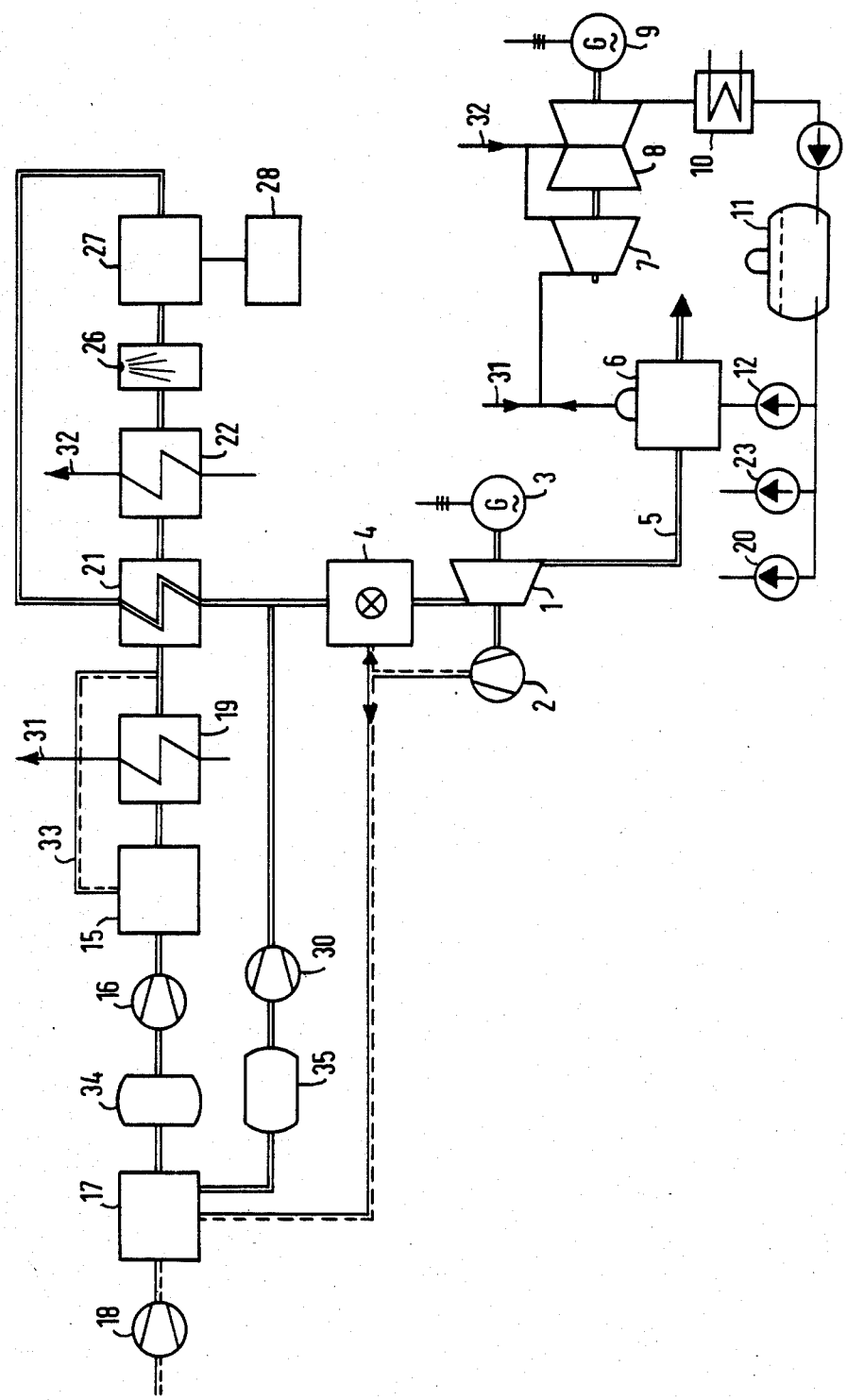

COMBINED GAS-TURBINE PLANT PRECEDED BY A COAL GASIFICATION PLANT

This application is a continuation of application Ser. No. 614,309, filed May 25, 1984 (abandoned).

BACKGROUND OF THE INVENTION

1. Field of the Invention

The invention relates to a power-generating station for the generation of electric power from gas produced from coal by means of a combination process in which the waste heat of the gas turbine is utilized for a following steam process and coal gas from a coal gasification plant is used as fuel.

2. Description of the Prior Art

In one known plant of this type, the exhaust gas line of the gas turbine block is connected on the primary side to a steam generator which is part of a steam turbine block which also contains a high pressure and a low pressure turbine, a condenser, a feedwater tank and a feedwater pump (DE-Z"Brennstoffe-Waerme-Kraft", 1979, pages 214 ff). A special relationship of the coal gasification plant and the gas-turbine block consisting of an air compressor, combustion chamber, gas turbine and generator may consist that a steam generator for utilizing the raw gas heat is followed by a heat exchanger for heating the purified gas by the raw gas and that the steam generator arranged ahead of the raw-gas/purified gas heat exchanger is designed as a high pressure steam generator, the output of which on the secondary side is connected to the output of the steam generator of the steam turbine block (British Pat. No. 20 75 124; U.S. Journal "Applied Energy", 1982, page 91).

In another known combined process, a coal gasification plant and a gas turbine block are related to each other such that, in addition to the purified gas from the coal gasification plant, part of the nitrogen produced in the air separation plant is fed to the combustion chamber and the excess part is admixed, entering the gas turbine air compressor, to the air stream drawn from the atmosphere, for the purpose of reducing the nitrous oxides (German DE-OS No. 31 00 751).

SUMMARY OF THE INVENTION

An object of the invention is to provide a combined gas-turbine/steam-turbine plant in which the exhaust gas line of the gas turbine block having an air compressor, combustion chamber gas turbine and generator is connected on the primary side to a steam generator which, in turn, comprises part of a steam turbine block which contains a high pressure and low pressure turbine, a condenser, a feedwater tank and a feedwater pump, and in which the combustion chamber of the gas turbine block is connected to the output of a coal gasification plant, the air separation unit of which has an outlet for the separated nitrogen, and the gasifier of which is followed by a steam generator for utilizing the raw gas heat, and a heat exchanger for heating the purified gas by the raw gas, wherein the steam generator arranged ahead of the raw gas/purified gas heat exchanger is a high pressure steam generator, the secondary output of which is connected to the output of the steam turbine block, to utilize the heat contained in the raw gas to effect greater efficiency of the overall plant and at the same time to minimize the formation of nitrous oxides in the combustion of the coal gas in the combustion chamber of the gas turbine block.

With the foregoing and other objects in view, there is provided in accordance with the invention a combined gas turbine/steam turbine plant with a coal gasification plant comprising (a) a gas turbine block which contains an air compressor for introduction of air into a combustion chamber of a gas turbine and a generator coupled to the turbine, (b) a steam turbine block which contains a steam generator, a high pressure and a low pressure turbine, a condenser for condensing steam from the turbine, a feedwater tank to collect the condensate and a feedwater pump to feed the water to the steam generator, said steam generator connected to said high pressure turbine for feeding high pressure steam, (c) a coal gasification plant which contains a gasifier for gasification of coal to produce raw fuel gas, an air separation unit to separate the air into oxygen and nitrogen with an outlet for the separated nitrogen and an outlet for the separated oxygen, an oxygen compressor to push the separated oxygen into the gasifier, and a compressor to supply the air separation unit with air, (d) a first high pressure heat exchanger in which the heat of the raw gas from the gasifier is utilized to generate high pressure steam, a second heat exchanger in which heat of the raw gas from the gasifier is utilized to heat the raw gas after purification and prior to introducing the purified gas into the combustion chamber of the gas turbine, a third heat exchanger following the second heat exchanger in which the heat of the raw gas from the gasifier is utilized to generate low pressure steam, and conduit means for passage of said low pressure steam to the low pressure part of the steam turbine, purification units through which the raw gas passes to remove impurities and a purified gas line through which the purified gas flows through the second heat exchanger thence into the combustion chamber, and (e) said nitrogen outlet of the air separation unit is connected only to the purified gas line leading to the combustion chamber or to burners in the combustion chamber.

Other features which are considered as characteristic for the invention are set forth in the appended claims.

Although the invention is illustrated and described herein as embodied in a combined gas-turbine/steam-turbine plant preceded by a coal gasification plant, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates a combined gas turbine/steam turbine with a coal gasification plant in which air is separated into oxygen and nitrogen and the oxygen forced into a coal gasifier wherein raw fuel gas is generated. Heat is recovered from the raw gas leaving the gasifier and high pressure steam is generated in a first high pressure heat exchanger. The generated high pressure steam is sent to the high pressure part of a steam turbine. Part of the thus partially cooled raw gas leaving the first heat exchange may be sent to the cooling zone of the gasifier. More heat is extracted from the raw gas in a second heat exchanger wherein the raw gas preheats purified gas prior to entering the combustion chamber of the gas turbine. Additional heat is removed from the raw gas in a third heat exchanger wherein low pressure steam is generated which may be sent to the low pressure part of the steam turbine. The raw gas is then treated in a conventional manner by scrubbing to remove impurities, particularly sulfur compounds such as $SO_2$ and $H_2S$ which may be converted to elemental sulfur in known method. A compressor feeds air to the combustion chamber and after start-up of the gas separation unit initiated by another compressor also, feeds air to the gas separation unit. Nitrogen from the gas separation unit may be admixed with the purified gas prior to entering the combustion chamber or may be sent to the burners of the gas turbine. Exhaust gas from the gas turbine goes to a high pressure steam turbine heat exchanger and the steam therefrom sent to the high pressure part of the steam turbine. Exhaust steam from the high pressure part is sent to the low pressure part of the steam turbine. Exhaust steam from the low pressure part is condensed and the condensate reused as feedwater to the steam generators.

DETAILED DESCRIPTION OF THE INVENTION

According to the invention, the raw gas/purified gas heat exchanger is followed by a low-pressure steam generator, the output of which on the secondary side is connected to the low-pressure part of the steam turbine. The nitrogen outlet of the air separation unit located in the coal gasification plant is connected exclusively to the purified gas line leading to the combustion chamber of the gas turbine and/or to the burners in the combustion chamber.

Through such an arrangement of the overall plant, the heat contained in the raw gas is optimally used because it is transferred into the steam turbine process. At the same time the amount of energy required for reducing nitrous oxides in the exhaust gas of the gas turbine is reduced or is coupled to the energy required in the air separation unit of the coal gasification plant.

A further improvement of the overall efficiency of the plant is achieved by feeding that part of the raw gas leaving the high-pressure heat exchanger back into the cooling zone of the gasifier of the coal gasification plant, and therefore, the throughput of raw gas through the high-pressure heat exchanger is increased and thereby the output of the heat exchanger is raised.

An embodiment example of the overall plant in accordance with the invention is schematically shown in the drawing.

The overall plant has three components: a gas turbine block, a steam turbine block and a coal gasification plant. The gas turbine block includes the gas turbine 1 which drives the compressor 2 and the generator 3 and the combustion chamber 4 which precedes the gas turbine. The exhaust gas line 5 from gas turbine 1 leads to the heat exchanger 6 which latter is part of the steam turbine block. The steam turbine block also includes the high-pressure part 7 and the low-pressure part 8 of a steam turbine with the associated generator 9, the condenser 10 connected thereto, the feedwater tank 11 and the feedwater pump 12.

The coal gasification plant contains as the main unit the gasifier 15 preceded by an oxygen compressor 16 and the air separation unit 17 wherein air is separated into oxygen and nitrogen. The air separation unit 17 is supplied with air from the air compressor 2 of the gas turbine, and additionally required air can be fed-in via the starting-up compressor 18. Gasification of coal in a gasifier to produce raw fuel gas is known in the art. Separation of air into oxygen and nitrogen in a gas separation unit is also known.

The gasifier 15 is followed by the high pressure heat exchanger 19 which is fed on the secondary side from the feedwater tank 11 of the steam turbine block by means of the pump 20. The generated high pressure steam is fed via the line 31 into the steam line between the steam generator 6 and the high pressure steam turbine 7.

The high pressure steam generator 19 is followed by the raw-gas/purified-gas heat exchanger 21 in which the purified gas is preheated by indirect contact with the raw gas prior to entering the combustion chamber 4. Heat exchanger 2 is followed by the low pressure steam generator 22. The latter is supplied on the secondary side with feedwater via the pump 23. The generated low pressure steam is introduced through the steam line 32 into the low pressure part 8 of the steam turbine.

The heat exchangers 19, 21 and 22 are followed by a washing plant consisting of the two units 26 and 27 in which the raw gas is purified and hydrogen sulfide recovered as an impurity is directed to plant 28 for converting the separated hydrogen sulfide into elemental sulfur.

The nitrogen produced in its entirety in the air separation unit 17 is fed to the combustion chamber 4 via the compressor 30. The nitrogen can be admixed to the purified gas before it enters the combustion chamber, or it can be fed separately and directly to the burners of the gas turbine combustion chamber.

The oxygen produced in the air separation plant 17 is fed to the oxygen compressor 16 via an oxygen buffer accumulator 34 which is arranged between the air separation plant 17 and the oxygen compressor 16, and is under pressure.

In the same way, the nitrogen produced in the air separation plant 17 is fed to the nitrogen compressor 30 via a nitrogen buffer accumulator 35 under pressure.

For improving the thermal performance of the high pressure heat exchanger 19, the gas line 33 which feeds part of the raw gas cooled down to about 400° C. (guidepost value) to a cooling zone of the gasifier 15 wherein the cooled down raw gas from heat exchanger 19 contacts the hot raw gas generated in gasifier 19 before it discharges from gasifier 19. The cooled down raw gas from heat exchanger 19 can be branched off on the primary side behind this heat exchanger. This cooling down of the hot raw gas in the gasifier prior to its leaving the gasifier effects greater settling of solid particles, particularly larger particles which would otherwise be carried into heat exchanger 19 and impair its thermal performance.

The foregoing is a description corresponding, in substance, to Germany application P 33 19 711.3, dated May 31, 1983, international priority of which is being claimed for the instant application, and which is hereby made part of this application. Any material discrepancies between the foregoing specification and the specification of the aforementioned corresponding German application are to be resolved in favor of the latter.

We claim:

1. Combined gas turbine/steam turbine plant with a coal gasification plant comprising
   (a) a gas turbine block which contains an air compressor for introduction of air into a combustion chamber of a gas turbine and a generator coupled to the turbine,
   (b) a steam turbine block which contains a steam generator, a high pressure and a low pressure turbine, a condenser for condensing steam from the turbine, a feedwater tank to collect the condensate and a feedwater pump to feed the water to the steam generator, said steam generator connected to said high pressure turbine for feeding high pressure steam,
   (c) a coal gasification plant which contains a gasifier for gasification of coal to produce raw fuel gas, an air separation unit to separate the air into oxygen and nitrogen with an outlet for the separated nitrogen and an outlet for the separated oxygen, an oxygen compressor to push the separated oxygen into the gasifier, and a compressor to supply the air separation unit with air,
   (d) a first high pressure heat exchanger in which the heat of the raw gas from the gasifier is utilized to generate high pressure steam, first heat exchanger discharge connecting means connecting the first heat exchanger with a second heat exchanger for the passage of cooled raw gas from the first heat exchanger to the second heat exchanger in which heat of the raw gas from the gasifier is utilized to heat the raw gas after purification and prior to introducing the purified gas into the combustion chamber of the gas turbine, a third heat exchanger following the second heat exchanger in which the raw gas is cooled to a lower temperature immediately prior to purification, a feedwater line with a pump connected to the third heat exchanger for passage of feedwater to cool the raw gas to the lower temperature and to utilize the heat of the raw gas from the gasifier to generate low pressure steam, and conduit means for passage of said low pressure steam to the low pressure part of the steam turbine, purification units through which the lower temperature raw gas passes to remove impurities and a purified gas line through which the purified gas flows through the second heat exchanger thence into the combustion chamber, and
   (e) said nitrogen outlet of the air separation unit is connected only to the purified gas line leading to the combustion chamber or to burners in the combustion chamber.

2. Combined gas turbine/steam turbine plant with a coal gasification plant comprising
   (a) a gas turbine block which contains an air compressor for introduction of air into a combustion chamber of a gas turbine and a generator coupled to the turbine,
   (b) a steam turbine block which contains a steam generator, a high pressure and a low pressure turbine, a condenser for condensing steam from the turbine, a feedwater tank to collect the condensate and a feedwater pump to feed the water to the steam generator, said steam generator connected to said high pressure turbine for feeding high pressure steam,
   (c) a coal gasification plant which contains a gasifier for gasification of coal to produce raw fuel gas, an air separation unit to separate the air into oxygen and nitrogen with an outlet for the separated nitrogen and an outlet for the separated oxygen, an oxygen compressor to push the separated oxygen into the gasifier, and a compressor to supply the air separation unit with air,
   (d) a first high pressure heat exchanger in which the heat of the raw gas from the gasifier is utilized to generate high pressure steam, first heat exchanger discharge connecting means connecting the first heat exchanger with a second heat exchanger for the passage of cooled raw gas from the first heat exchanger to the second heat exchanger in which heat of the raw gas from the gasifier is utilized to heat the raw gas after purification and prior to introducing the purified gas into the combustion chamber of the gas turbine, a third heat exchanger following the second heat exchanger in which the heat of the raw gas from the gasifier is utilized to generate low pressure steam, and conduit means for passage of said low pressure steam to the low pressure part of the steam turbine, purification units through which the raw gas passes to remove impurities and a purified gas line through which the purified gas flows through the second heat exchanger thence into the combustion chamber,
   (e) cooled raw gas return means connecting the first heat exchanger discharge means with the gasifier for return of a portion of the thus cooled raw gas into the gasifier of the coal gasification plant, and
   (f) said nitrogen outlet of the air separation unit is connected only to the purified gas line leading to the combustion chamber or to burners in the combustion chamber.

* * * * *